United States Patent [19]

Jones, Jr. et al.

[11] Patent Number: 5,779,005
[45] Date of Patent: Jul. 14, 1998

[54] CONSTANT FLOW CASCADE LUBRICATION SYSTEM

[75] Inventors: William B. Jones, Jr., Whittier; Mark L. Hall, Garden Grove; Vahe Hayrapetian; Khajak Jack Minassian, both of Glendale, all of Calif.

[73] Assignee: Ingersoll-Dresser Pump Company, Liberty Corner, N.J.

[21] Appl. No.: 807,311

[22] Filed: Feb. 27, 1997

[51] Int. Cl.⁶ .................................................. F16N 13/20
[52] U.S. Cl. ...................... 184/6.18; 184/11.2; 184/31; 384/101; 384/378; 384/472; 384/473; 415/111; 415/112; 415/175
[58] Field of Search .......................... 184/6.18, 11.1, 184/11.2, 13.1, 31; 415/111, 112, 175, 72, 73, 74, 75; 384/101, 378, 472, 473, 606; 416/176, 177

[56] References Cited

U.S. PATENT DOCUMENTS

| | | | |
|---|---|---|---|
| 1,425,000 | 8/1922 | Frost | 384/472 |
| 1,920,326 | 8/1933 | Schuck et al. | 384/472 |
| 3,767,013 | 10/1973 | Caldwell | 384/606 |
| 4,700,808 | 10/1987 | Haentjens | 184/6.18 |
| 5,261,783 | 11/1993 | Noyes | 415/71 |

FOREIGN PATENT DOCUMENTS

| | | | |
|---|---|---|---|
| 434054 | 8/1935 | United Kingdom | 184/6.18 |

*Primary Examiner*—Christopher Verdier
*Attorney, Agent, or Firm*—Robert F. Palermo

[57] ABSTRACT

A system for lubricating bearings on a vertical rotatable shaft within a bearing housing, is comprised of an annular lower lubricant sump at a lower portion of the bearing housing; an annular upper lubricant reservoir at an upper portion of the bearing housing; and a conduit providing fluid communication between the lower lubricant sump and the upper lubricant reservoir. Provision is made for metering a flow of lubricant from the upper lubricant reservoir into upper bearings. The lubricant is pumped from the lower lubricant sump, through the conduit, to the upper lubricant reservoir at a rate exceeding the rate of metered flow into the upper bearings. A constant head of lubricant above the metering orifice is provided in the upper lubricant reservoir, as well as an outlet for shunting excess lubricant back to the lower lubricant sump.

16 Claims, 2 Drawing Sheets

CONSTANT FLOW CASCADE LUBRICATION SYSTEM

BACKGROUND OF THE INVENTION

This invention relates generally to lubrication of bearings on a rotatable shaft and more particularly to supplying a lubricating fluid to bearings, within a vertical wet-sump bearing housing, at a constant flow rate which is independent of operating speed.

Present bearing lubrication systems for vertical wet sump bearing housings are typically designed to supply lubricant at a flow rate specific to a design operating speed. They pump lubricant from a sump at the bottom of the housing to bearings at the top of the housing. The lubricant flows down through the bearings and returns to the sump. The amount and flow rate of lubricant supplied to the bearings is limited by the operating speed of the pump mechanism, the viscosity of the lubricant, and the size of the passages through which the lubricant is pumped to the bearings. While such systems, assuming constant viscosity, perform adequately at the design speed, they may become ineffective at low operating speed, or they may provide excess lubricant at high operating speed, as would be encountered with a variable speed drive input. Thus, at low speed lubrication may be inadequate, while at high speed excessive lubricant flow may cause over pressure which leads to seal failure and leakage of lubricant to the surroundings.

In addition, lubricants are viscous liquids which are subject to viscosity changes which are inversely related to temperature variations. Thus temperature increases cause viscosity decreases, and temperature decreases cause viscosity increases. Even when operating at design speed, the lubricant becomes hot due to mechanical heat generation and loses viscosity. This causes decreased pumping action and results in inadequate lubrication of the bearings. Such inadequacies result in costly damage to equipment and the environment.

The foregoing illustrates limitations known to exist in present lubrication systems for vertical wet sump bearing housings. It would clearly be advantageous to provide an improvement directed to overcoming one or more of the limitations set forth above. Accordingly, a suitable alternative is provided including features more fully disclosed hereinafter.

SUMMARY OF THE INVENTION

In one aspect of the present invention, this is accomplished by providing a system for lubricating bearings on a vertical rotatable shaft within a bearing housing, including an annular lower lubricant sump at a lower portion of the bearing housing; an annular upper lubricant reservoir at an upper portion of the bearing housing; a conduit providing fluid communication between the lower lubricant sump and the upper lubricant reservoir; means for metering a flow of lubricant from the upper lubricant reservoir into upper bearings; means for pumping lubricant from the lower lubricant sump, through the conduit, to the upper lubricant reservoir at a rate exceeding a rate of metered flow into the upper bearings; and means in the upper lubricant reservoir for maintaining a constant head of lubricant above the metering means and for shunting excess lubricant back to the lower lubricant sump.

The foregoing and other aspects will become apparent from the following detailed description of the invention when considered in conjunction with the accompanying drawings.

DETAILED DESCRIPTION

Figure 1:
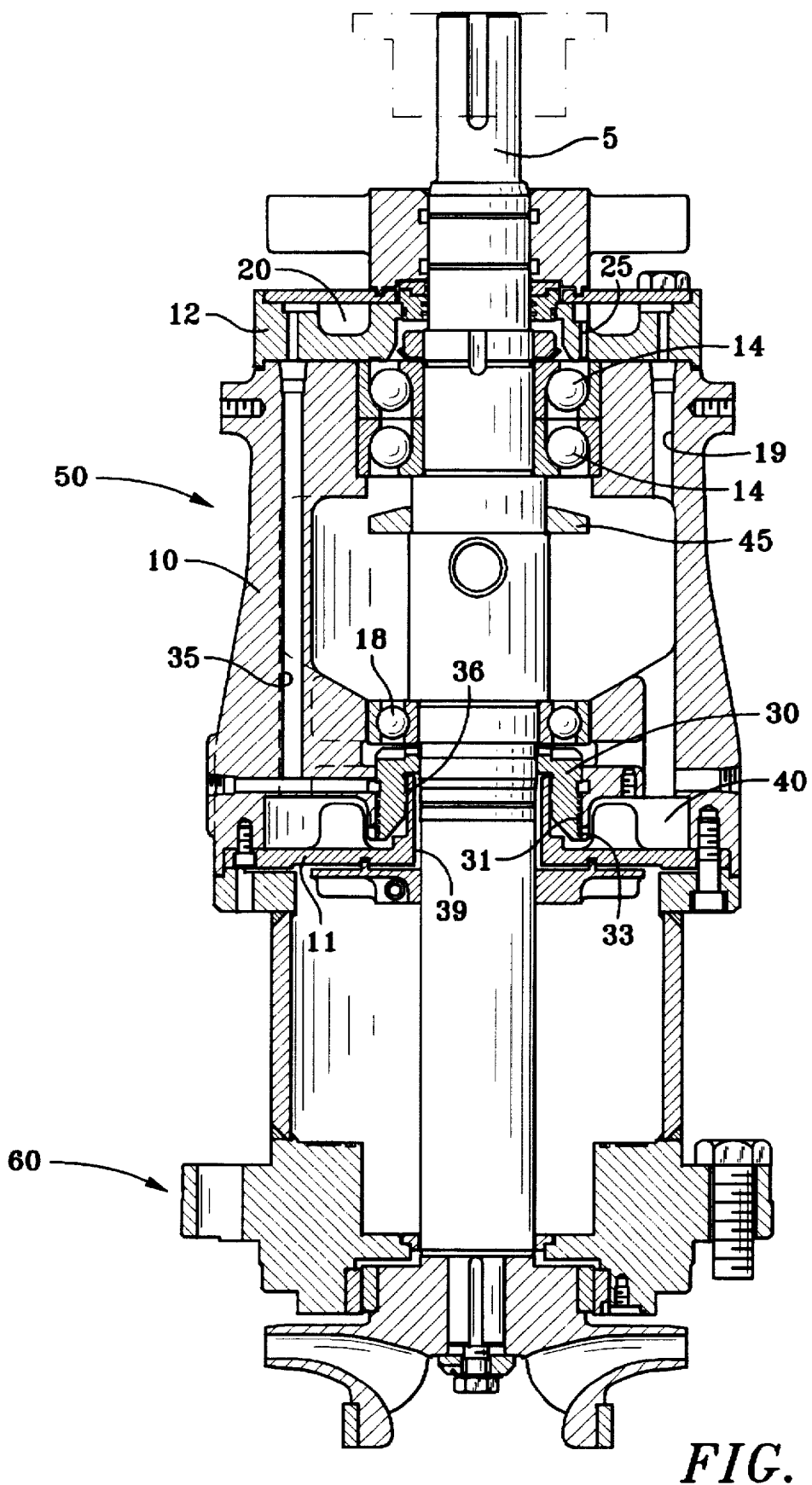
FIG. 1 is a vertical schematic partially sectional view of a pump equipped with a vertical wet sump lubrication system according to the invention.
Figure 2:
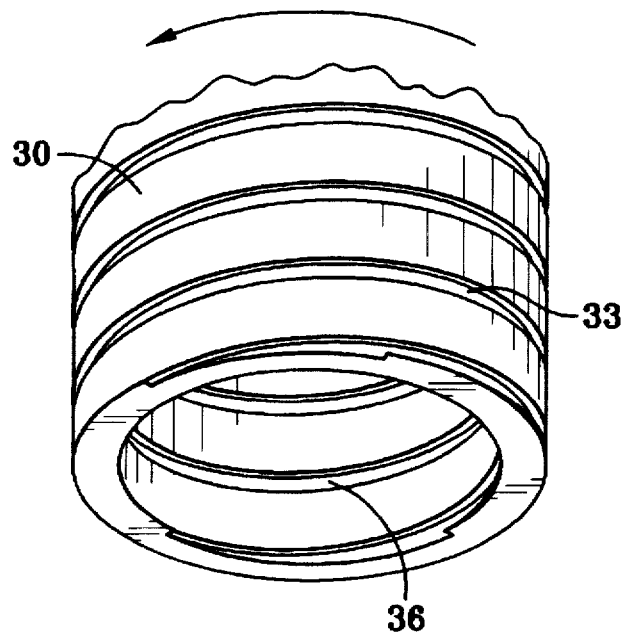
FIG. 2 is a fragmentary bottom perspective view of the pumping device.
Figure 3:
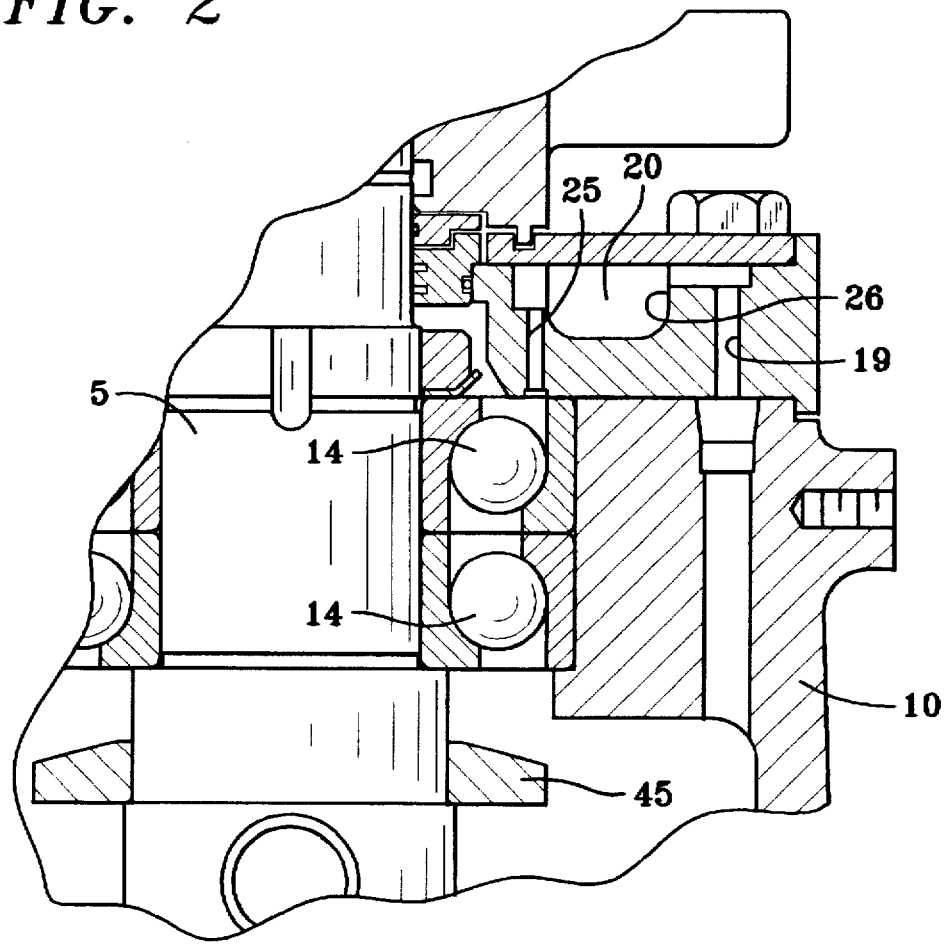
FIG. 3 is a fragmentary sectional elevation view of the lubricant metering and shunt features of the upper lubricant reservoir.

All the main features of the invention can be seen by referring to FIG. 1; however, it is also helpful to refer to FIGS. 2 and 3, as appropriate, to further appreciate details of the pumping, metering, and shunting provisions. In FIG. 1, the invention is shown as applied to a vertical pump unit 60. A bearing housing assembly 50 has upper bearings 14 and lower bearings 18 supporting a rotatable shaft 5 which is mounted within the bearing housing 10. A lower annular lubricant sump 40 in the lower end cover 11 of the housing 10 and an upper annular lubricant reservoir 20 in the upper end cover 12 are connected by a conduit 35, which is preferably bored in the wall of housing 10. A cup-like pumping or lifting device 30, which is fixed to the rotatable shaft 5, pumps lubricant by means of at least one helical groove 33 in the outer surface thereof, which groove cooperates with the inner wall 31 of a bore through which the cup-like pumping device 30 extends downward into the lower lubricant sump 40. Note that there is no contact between the cup-like pumping device 30 and the inner wall 31 of the bore. The groove 33 is sized such that it pumps an excess quantity of lubricant to the upper bearings 14 at all operating speeds. These features are seen in FIGS. 1 and 2.

The upper lubricant reservoir 20, seen in FIGS. 1 and 3, has a spillway or overflow barrier 26 which maintains a constant pressure head above the metering orifice 25. Metering orifice 25 is sized to provide full lubrication, as required by the upper bearings 14, at all operating speeds and viscosity ranges. The metering orifice 25 has its mouth located slightly above the bottom of the upper reservoir 20 to retain a small amount of lubricant in the reservoir 20 upon shut-down. This assures a minimal response time for supplying lubricant to the upper bearings 14 when re-starting the unit after such shutdown. Any excess lubricant reaching upper reservoir 20 passes over overflow barrier 26 and is shunted back to the lower sump 40 through shunt passage 19. This overflow and shunt feature allows the pumping device to operate with no throttling or other constriction without regard to operating speed; because the full lubricant requirements are always met, and any excess lubricant is merely returned to the lower sump 40. A portion of the excess lubricant is directed, by the bowl shaped lower surface of the housing 10, through the lower bearings 18 before draining to the lower sump 40.

Lubricant which passes through upper bearings 14 falls onto slinger ring 45 attached to the shaft 5 below the bearings 14. The slinger ring 45 throws the lubricant against the wall of bearing housing 10 where it gives up heat collected by contacting various parts of the bearings and shaft 5. By design, lubricant which is not actually lubricating the bearings is exposed as much as possible to cooler surfaces within the bearing housing 10. This helps to dissipate heat and to maintain a steady state operating temperature.

The cup-like pumping device 30 also acts as a heat sink to extract heat from the shaft 5 adjacent to the lower bearing 18. The intimate mixing contact between the lubricant and the pumping device 30 assures maximum heat transfer to the lubricant, which then serves to carry the heat to the housing walls 10,11,12 and to thus dissipate it to the surroundings of the housing assembly 50. This feature is important especially if the shaft 5 is exposed to an external heat source such as hot pumpage or hot air. Thus, under any operating conditions, the bearing housing assembly 50 quickly achieves a steady-state operating temperature.

A seal is provided to prevent escape of lubricant from the lower sump 40. This is accomplished without contact between stationary and rotating parts. The lower sump 40 has an inner wall 39 which extends above the top of the stationary lubricant level and, without contacting it, surrounds the shaft 5 and effectively provides a static seal. No further sealing would be needed except for induced turbulence in the lubricant within the lower sump 40. To counteract turbulence induced lubricant loss, a non-contacting dynamic axial counterflow sealing device is provided using the cup-like pumping device 30. A helical groove 36 on the inner surface of the pumping device 30, having an opposite handing from the pumping groove 33, pumps lubricant downward during operation. The groove 36 cooperates with the outer surface of inner wall 39 without contact, in the same manner as groove 33 cooperates with wall 31 of the bore without contact.

The bearing lubrication system has been shown in FIG. 1 as applied to a pump. It is very clear that any vertical bearing housing which is lubricated by a wet sump lubrication system can benefit from the features disclosed here.

Having described the invention, we claim:

1. A system for lubricating bearings on a vertical rotatable shaft within a bearing housing, comprising:

an annular lower lubricant sump at a lower portion of said bearing housing;

an annular upper lubricant reservoir at an upper portion of said bearing housing;

a conduit providing fluid communication between said lower lubricant sump and said upper lubricant reservoir;

means for metering a flow of lubricant from said upper lubricant reservoir into upper bearings;

means for pumping lubricant from said lower lubricant sump, through said conduit, to said upper lubricant reservoir at a rate exceeding a rate of said metered flow into said upper bearings; and means in said upper lubricant reservoir for maintaining a constant head of lubricant above said metering means and for shunting excess lubricant back to said lower lubricant sump.

2. The system of claim 1, wherein the means for pumping lubricant from said lower lubricant sump, through said conduit, to said upper lubricant reservoir also serves as a heat sink means for extracting heat from lower bearings and for transferring said heat to the lubricant for dissipation to surroundings of said housing.

3. The system of claim 1, further comprising:

means, in said lower lubricant sump, for providing a non-contacting seal for retaining lubricant within said bearing housing.

4. The system of claim 1, wherein the means for metering a flow of lubricant from said upper lubricant reservoir into upper bearings comprises at least one passage through a bottom wall of said upper lubricant reservoir to said upper bearings, said at least one passage being sized to provide full lubricant flow to said bearings independently of operating speed.

5. The system of claim 4, wherein the means in said upper lubricant reservoir for maintaining a constant head of lubricant and for shunting excess lubricant comprises an outer wall of said upper lubricant reservoir having an overflow to a shunt passage which drains excess lubricant through said bearing housing and back to said lower lubricant sump.

6. The system of claim 1, wherein the means for pumping lubricant from said lower lubricant sump through said conduit to said upper lubricant reservoir comprises a substantially cylindrical collar fixed to said rotatable shaft below a lower bearing and having a cup-like portion extending downwardly through a bore in a lower wall of said bearing housing into said lower lubricant sump, said cup-like portion having a close fit within said bore and having a helical groove on its outer cylindrical surface which lifts lubricant fluid through said conduit into said upper lubricant reservoir.

7. The system of claim 6, further comprising:

means on an inner cylindrical surface of said cup-like portion for providing a non-contacting seal for retaining lubricant within said bearing housing.

8. The system of claim 7, wherein the means on an inner cylindrical surface of said cup-like portion for providing a non-contacting seal comprises a helical groove having an opposite handing from that of the groove on the outer cylindrical surface and lying in close proximity to an annular wall, said annular wall surrounding said rotatable shaft and extending upwardly from a lower wall of said lower lubricant sump to a point slightly below the point of attachment of said substantially cylindrical collar to said rotatable shaft, said helical groove on the inner surface of said cup-like portion acting to produce a counterflow of fluid down said annular wall to dynamically oppose escape of lubricant from said bearing housing.

9. The system of claim 1, further comprising:

means for dissipating excess heat from said lubricant to surroundings of said bearing housing.

10. The system of claim 9, wherein the means for dissipating excess heat from said lubricant comprises slinger means fixed to said rotatable shaft below said upper bearings for deflecting lubricant coming from said bearings to side walls of said bearing housing, and directing all lubricant flow which is not through said upper bearings to side walls of the bearing housing, where said lubricant surrenders said excess heat to said side walls.

11. The system of claim 3, wherein the means, in said lower lubricant sump, for providing a non-contact retention of lubricant comprises an annular wall surrounding said rotatable shaft and extending upwardly from a lower wall of said lower lubricant sump to a point above a stationary lubricant level in said sump, said annular wall being stationary and having no contact with said rotatable shaft or any moving part.

12. A system for lubricating bearings on a vertical rotatable shaft within a bearing housing, comprising:

a lower lubricant sump at a lower portion of said bearing housing;

an upper lubricant reservoir at an upper portion of said bearing housing;

a conduit providing fluid communication between said lower and upper lubricant sumps;

means for metering a gravity induced flow of lubricant from said upper lubricant reservoir into upper bearings;

means for pumping lubricant from said lower lubricant sump, through said conduit, to said upper lubricant reservoir at a rate exceeding a rate of said gravity induced flow into said upper bearings;

means in said upper lubricant reservoir for maintaining a constant head of lubricant above said metering means and for shunting excess lubricant back to said lower lubricant sump; and means for feeding a portion of said excess lubricant to lower bearings before said excess lubricant is returned to said lower lubricant sump.

13. The system of claim 12, further comprising:

means, in said lower lubricant sump, for providing a non-contacting seal for retaining lubricant within said bearing housing.

14. The system of claim 12, wherein the means for metering a gravity induced flow of lubricant from said upper lubricant reservoir into upper bearings comprises at least one passage from said upper lubricant reservoir to said upper bearings, said at least one passage being sized to provide full required lubricant flow to said bearings at all operating speeds.

15. A system for lubricating bearings on a vertical rotatable shaft within a bearing housing, comprising:

a lower lubricant sump at a lower portion of said bearing housing;

an upper lubricant reservoir at an upper portion of said bearing housing;

a conduit providing fluid communication between said lower lubricant sump and said upper lubricant reservoir;

means for metering a flow of lubricant from said upper lubricant reservoir into upper bearings;

means for pumping lubricant from said lower lubricant sump, through said conduit, to said upper lubricant reservoir at a rate exceeding a rate of said metered flow into said upper bearings; means in said upper lubricant reservoir for maintaining a constant head of lubricant above said metering means and for shunting excess lubricant back to said lower lubricant sump; and means for feeding a portion of said excess lubricant to lower bearings before said excess lubricant is returned to said lower lubricant sump.

16. The system of claim 14, wherein the means for pumping lubricant from said lower lubricant sump, through said conduit, to said upper lubricant reservoir also acts as a heat sink means for extracting heat from said rotatable shaft adjacent to said lower bearings and for transferring said heat to the lubricant for dissipation to the surroundings.

* * * * *